United States Patent Office

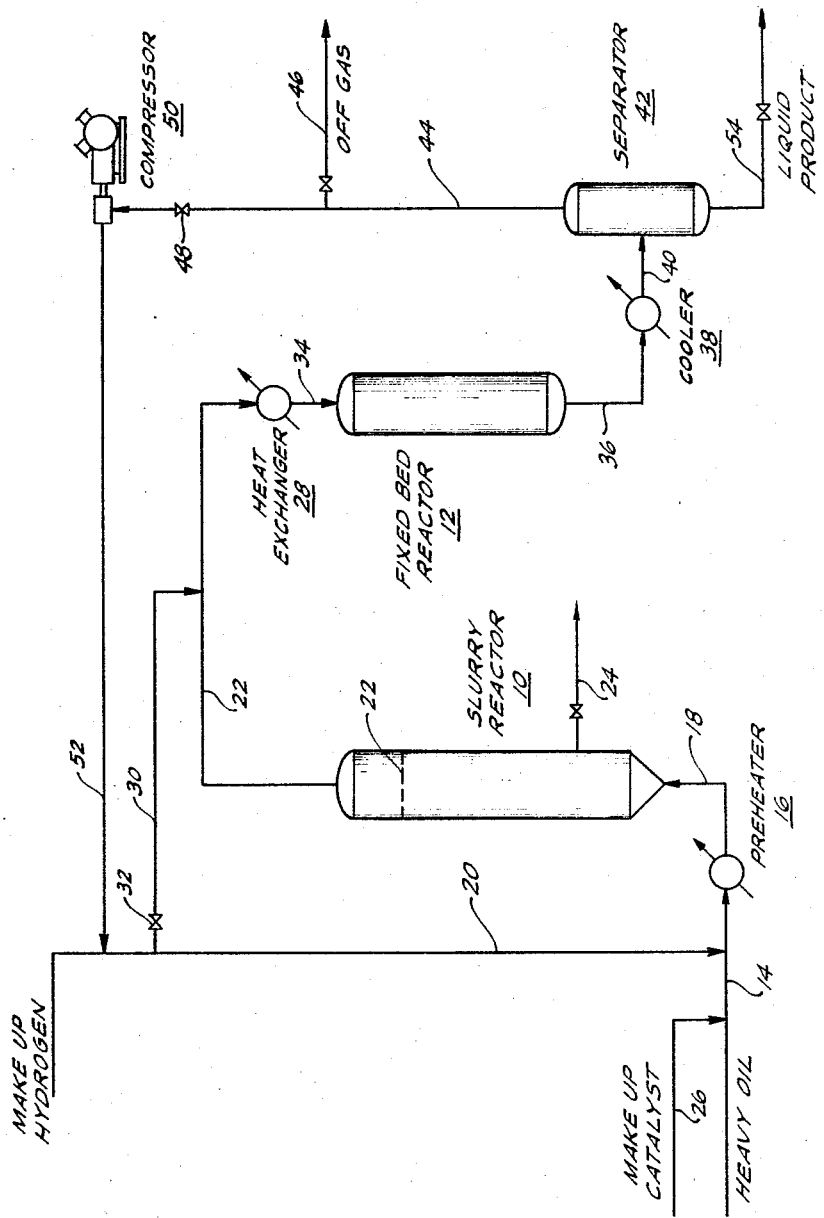

3,297,563
TREATMENT OF HEAVY OILS IN TWO STAGES
OF HYDROTREATING
Thomas F. Doumani, Whittier, Calif., assignor to Union Oil Company of California, Los Angeles, Calif., a corporation of California
Filed Aug. 17, 1964, Ser. No. 390,060
14 Claims. (Cl. 208—59)

This invention relates to the treatment of heavy mineral oils; and in particular, relates to catalytic upgrading of crude oils or residua in the presence of hydrogen. Specific treatments contemplated include hydrogenating, hydrocracking and hydrofining.

I have discovered that heavy mineral oils which contain materials boiling above 1,000° F. can be converted to useful low-boiling products, having low sulfur, nitrogen and oxygen contents, in a two-stage catalytic treating process. The essential features of my process comprise contacting heavy mineral oil in liquid phase at elevated temperatures and pressures with a powdered hydrogenating catalyst suspended therein and forming a slurry, while passing hydrogen through the slurry at controlled rates hereinafter prescribed to keep the liquid saturated with hydrogen, and to maintain the catalyst in a dispersed state. Partially refined lower boiling vaporized materials and hydrogen are withdrawn from the slurry and contacted with a fixed bed of macropellet hydrofining catalyst in a second contacting zone to complete the desired removal of sulfur, nitrogen and oxygen from the low-boiling materials.

U.S. Patent 3,119,765 describes a two-stage method for treating heavy oils which is somewhat similar to my process. Heavy oil and hydrogen are passed through a first macropellet catalyst zone under conditions of elevated temperature and pressure. Liquid and vapor products are withdrawn from the first zone and separated into a liquid phase which is recycled thereto, and a low-boiling vapor phase which is transferred to a second macropellet catalyst zone for sulfur removal, i.e., hydrofining.

Difficulties are encountered in the aforedescribed patented process when heavy mineral oils, i.e., having components boiling above 1,000° F., are refined over an extended period of time. In such cases, the interior surface areas of macropellet catalyst in the first catalyst bed become relatively useless due to slow diffusion rates through the liquid barrier in and surrounding the catalyst pellets. As a result, only a portion of the active catalyst surface area is effectively utilized. Moreover, the rate of catalyst deactivation is very rapid due to the adsorption of heavy coke-forming materials on interior catalyst surfaces where the supply of hydrogen is deficient due to the low diffusion rates of hydrogen through the liquid barrier. Because of this rapid deactivation and limited effective surface area of catalyst, thermal cracking reactions become relatively more prominent, with resultant production of a relatively unsaturated and unstable product.

The unsaturated product from the first contacting zone of the patented process is only partially refined, requiring further treatment in the second catalytic contacting zone to remove sulfur, nitrogen and oxygen. To accomplish this, effluent from the first zone is separated into a liquid phase which is recycled to the first zone, and a vapor phase that is further refined in a second contacting zone. Since the liquid-vapor separation is made in the complete absence of catalyst, but under conversion conditions of temperature and pressure, further thermal cracking occurs during the separation step with resultant formation of additional unsaturated compounds. Therefore, subsequent catalytic refining of the total vaporized products (obtained in the first contacting zone and during the separation process) results in rapid catalyst deactivation since the unsaturated materials readily polymerize and form coke on interior surfaces of the macropellet hydrofining catalyst.

I have found that the aforementioned difficulties can be overcome by employing in the first contacting zone a finely divided, homogeneously distributed, powdered catalyst, and by sweeping out vaporized product as formed directly from the slurried catalyst zone by means of a substantial stream of circulating hydrogen. By operating in this manner, thermal cracking is minimized and the saturated low-boiling hydrocarbons formed are immediately withdrawn from the liquid phase and into a hydrogen-rich vapor phase which effectively inhibits further formation of unsaturated compounds. Subsequent refining of these vaporized products for removal of sulfur, nitrogen and oxygen can be accomplished in the fixed bed macropellet catalyst contacting zone with greatly reduced catalyst deactivation rates resulting from coke formation on the surfaces of the catalyst. At the same time, coking rates in the first treating zone are also greatly reduced because of the extended operative exterior surface area of catalyst all of which is effectively exposed to the action of dissolved hydrogen.

The invention can perhaps be best understood with reference to the accompanying drawing wherein the single figure is a schematic flow sheet illustrating a preferred form of the present invention.

Turning now to the drawing, there is shown a first-stage slurry reactor 10 and a second-stage fixed bed reactor 12. The first-stage reactor 10 initially contains a bed of finely divided, powdered hydrogenation catalyst and the second-stage fixed bed reactor 12 is provided with a macropellet catalyst bed. The heavy mineral oil feedstock is charged by way of line 14 to preheater 16 where the charge is heated to a desired conversion temperature. Make-up and recycle hydrogen is added to the oil in line 14 by way of line 20. The thus prepared mixture of feed components is discharged from preheater 16 by way of a charge line 18 into the bottom of the first-stage slurry reactor 10 at a rate sufficient to maintain a predetermined liquid level 20 therein. Passage of hydrogen-rich gas through the catalyst-oil mixture disperses the finely divided catalyst substantially homogeneously in the oil and forms a slurry. Additional catalyst dispersing can be obtained through the use of any conventional stirring means.

Under the conversion conditions in reactor 10, the heavy feedstock is hydrocracked and/or desulfurized by a smooth hydrogenolysis reaction with the proper hydrogenating catalyst. Since the finely divided hydrogenation catalyst is in intimate contact with the heavy oil feedstock in reactor 10, substantially all of the vaporized hydrocarbons formed are saturated compounds, i.e., contain few double bonds. The converted materials in vapor phase are swept out of reactor 10 by way of discharge line 22 together with hydrogen-rich recycle gases. No liquid phase products are removed from reactor 10, and accordingly the difficultly convertible compounds in the feedstock remain until they are converted to lower molecular weight materials. A bleed stream of the slurry can be withdrawn from reactor 10 by way of valved discharge line 24 to remove ash accumulations, etc. Make-up catalyst, e.g., regenerated catalyst, can be added to the heavy feed oil in charge line 14 via make-up catalyst line 26.

The vaporized hydrocarbons and hydrogen-rich recycle gas from reactor 10 are passed via discharge line 22 to heat exchanger 28 where they may be cooled or heated to a predetermined reaction temperature. Make-up hydrogen may be added to the vaporized hydrocarbons in line 22 by way of line 30 controlled by valve 32. The vaporized hydrocarbons and hydrogen-rich gases are discharged from cooler 28 by way of charge line 34 into the top of the second-stage fixed-bed reactor for further hydrofining treatment. As a consequence of the second-stage hydrofining, the sulfur, nitrogen, and oxygen content of the vaporized product is materially reduced. Since the vaporized products from reactor 10 are substantially entirely saturated compounds, coke is not readily formed in reactor 12, and accordingly the reactor can be operated for extended periods of time, e.g. 3–12 months or more, deactivating the hydrofining catalyst.

The total effluent from second-stage reactor 12 is discharged by way of line 36 leading to cooler 38 where liquefiable hydrocarbons are condensed. From cooler 38 the total effluent is charged via line 40 to a high-pressure separator 42. A recycle gas phase consisting principally of hydrogen and containing normally gaseous hydrocarbons is taken overhead by way of line 44. Normally, a portion of the recycle gas will be bled from the system by a valved discharge line 46 to prevent the build-up of light hydrocarbons in the system. The remaining recycle gas may be charged by way of line 44, controlled by valve 48, to a compressor 50 discharging into line 52 and hydrogen make-up line 20. The liquid phase from the separator 42 is discharged by way of valved line 54 and can be further treated as for example by distillation. The pressure in the first and second reactors can be controlled by valved lines 46 and 54.

Suitable feedstocks for my process are heavy mineral oils containing at least about 10 volume-percent of components boiling above about 1,000° F. These materials generally contain molecules of highly complex chemical structure, most of which contain sulfur, nitrogen and/or oxygen, as well as carbon and hydrogen. Examples of such materials are petroleum residua, shale oil, crude oils, etc. In general, at least about 30 volume percent, and preferably at least 50%, of the feedstock should boil above 1,000° F. Lighter mineral oils such as gas oils, kerosene, jet fuels, fuel oils, cycle oils from cracking operations, etc., can be admixed with the aforementioned heavy oils as diluents.

Hydrogenating catalysts for use in these treatments (either zone) comprise in general the transitional metals, and specifically vanadium, chromium, manganese, iron, cobalt, nickel, copper, zinc, molybdenum, ruthenium, rhodium, palladium, cadmium, tantalum, tungsten, iridium, platinum, etc. These metals may be employed in free form, or in the form of oxides, sulfides, sulfates, or other compounds. It is found in most cases that the sulfide form of the metal is preferred over the oxide form. The metals or their compounds may be employed singly, or in admixture with one or more other metal components. A preferred class of metals comprise the Group VI–B and Group VIII metals, and particularly combinations of one or more Group VI–B metal with one or more Group VIII metal.

The active hydrogenating component may be employed in substantially undiluted form, but may also be distended upon an absorbent carrier in proportions ranging between about 0.5 and 50 percent by weight. Suitable carriers include in general the difficultly reducible adsorbent inorganic oxides, for example, silica gel, alumina gel, mixtures of silica and alumina, zirconia, titania, magnesia, beryllia, etc. Various natural clays may also be employed after suitable activation by heat and/or acid treatment. Such clays include for example the various montmorillonite clays, e.g., bentonite.

It may sometimes be desirable to use the aforedescribed hydrogenation catalysts in combination with an adsorbent cracking base in the first reactor zone, i.e., hydrogenating components supported upon a more or less acidic cracking base. Suitable cracking bases include for example composites of silica-alumina, silica-magnesia, silica-zirconia, silica-zirconia-titania, and the like. These cracking bases are preferably impregnated with between about 1 and 30 percent by weight hydrogenating component. The metals nickel, cobalt, molybdenum, platinum, rhodium and palladium, or the sulfides thereof are preferred hydrogenating components for hydrocracking catalysts. Certain zeolitic molecular sieves may also be employed as hydrocracking catalyst bases. The preferred cracking bases comprise composites of silica and alumina containing about 50 to 90 percent silica; coprecipitated composites of silica, titania and zirconia, containing between about 5 and 75 percent of each component; crystalline, zeolitic, alumino-silicate molecular sieves, e.g. of the Y crystal type, having relatively uniform crystal pore diameters of about 6–15 angstroms. Any of these cracking bases may be further promoted by the addition of small amounts, e.g., 1–10 percent by weight, of halides such as fluorine, boron trifluoride, silica tetrafluoride, etc.

A relatively non-acidic hydrofining catalyst is generally used in the first and second-stage reaction zones. The operation generally referred to as hydrofining is carried out primarily to effect desulfurization, denitrogenation, deoxygenation, etc. Preferred catalysts for hydrofining include particularly the combination of Group VI–B metal oxides or sulfides with a Group VIII metal oxides or sulfides. Particularly desirable catalysts comprise cobalt sulfide plus molybdenum sulfide, or tungsten sulfide plus nickel sulfide which may, if desired, be supported on a hydrofining carrier. Suitable hydrofining carriers include in general the difficultly reducible inorganic oxides, e.g., silica, alumina, titania, clays such as bauxite, bentonite, etc. Preferably, the hydrofining catalyst base should have a Cat-A activity index below about 20. A preferred carrier is activated alumina, and especially activated alumina containing about 3–15 percent by weight of coprecipitated silica gel. The hydrofining catalyst is preferably in form of macropellets in the $\frac{1}{32}$-inch to $\frac{1}{2}$-inch size range.

The conversion conditions to be utilized in the first reaction zone, i.e., the slurry catalyst reactor, include temperatures of about 700 to 1,000° F. and preferably about 775 to 850° F., and pressures of about 100 to 5,000 p.s.i.g., and preferably about 500 to 3,000 p.s.i.g. The catalyst used in the slurry reactor is in the form of finely subdivided particles having diameters less than about 40 microns and preferably between about 0.01 and 10 microns. The quantity of powdered catalyst used in the reactor may vary between about 0.01 and 1.0 volume of per volume of liquid feed in the reactor (based upon the actual volume of catalyst used at its static bulk density). Optimum catalyst/oil ratios depend primarily on catalyst particle size, higher ratios being employed for large particle sizes and vice versa. While the second-stage reaction zone, i.e., the fixed bed reactor, can be operated at substantially the same conditions as the first-reaction zone, it is preferred to use a temperature of about 600 to 800° F., and most preferably 650 to 750° F. Liquid hourly space velocities in the second-stage reactor may vary between about 0.5 and 10.0 volumes of liquid feed per volume of catalyst per hour.

Hydrogen is used in the first reaction zone at a rate sufficient to vaporize low-boiling product at the desired rate while stripping the product from the reaction zone at a hydrogen partial pressure of at least about 70 percent of the total pressure, and to maintain the liquid-phase in the reactor saturated with dissolved hydrogen, e.g., 1,000 to 15,000 standard cubic feet per barrel of feed. The hydrogen rate in the second zone is about 500 to 15,000 standard cubic feet per barrel of feed. It may be found in some cases, as where the chemical consumption of hydrogen is high, that incremental injections of hydrogen at various levels of the slurry reactor will be desirable in order to maintain the limited excess required for product removal. Also, it is often desirable to add additional hydrogen to the vaporized products from the first reaction zone prior to the entry of said products into the fixed bed hydrofining reactor.

After long periods of use, the catalyst employed in the reactors will decline in activity due to the deposition of deactivating deposits. When this occurs, regeneration is normally carried out by controlled combustion of the stripped catalyst at, e.g., 800 to 1,500° F., using dilute oxygen-containing gases.

The following examples are cited to illustrate certain aspects of the invention, but are not intended to be limiting in scope.

*Example I*

Catalytic conversion apparatus similar to that illustrated in the drawing is used to treat a petroleum residuum having the following characteristics:

| | |
|---|---|
| Sulfur, wt. percent | 4.0 |
| Nitrogen, wt. percent | 0.85 |
| Gravity, °API | 9.0 |
| Boiling range, percent above 1,000° F. | 90 |

The slurry stage reactor utilizes as the catalyst a composition comprising about 3 percent cobalt oxide and 15 percent molybdenum oxide supported on activated synthetic alumina stabilized with about 5 percent of coprecipitated silica. The catalyst is ground to a fine powder, the particles of which are predominantly in the 0.5–10 micron diameter range and is present in the reaction zone in a ratio of about 15 volumes of liquid per volume of catalyst. Hydrogen is supplied at the bottom of the reactor at a rate corresponding to about 2,500 s.c.f. per barrel of feed while the reactor is maintained at a pressure of 600 p.s.i.g. and a temperature of 825° F. The vaporized conversion products from the slurry reactor are substantially entirely saturated with hydrogen and the original feedstock is about 60 percent desulfurized.

The vapor product from the slurry reactor is cooled to 725° F. and passed into the top of the fixed-bed reactor, which is also maintained at about 600 p.s.i.g. The catalyst in this reactor is a cobalt molybdate type containing 3 percent cobalt oxide and 15 percent molybdic oxide, supported on an activated alumina carrier in the ⅛-inch macropellet size range. A space velocity of about 3 volumes of feed per hour per volume of catalyst is used. The resulting product is about 99 percent desulfurized. An average temperature increase of less than about 0.5° F. per day is required to maintain the desired desulfurization in the fixed-bed reactor. Run lengths of at least 3 months are readily obtainable in each reactor.

*Example II*

The procedure of Example I is repeated with the exception that the slurry reactor is replaced with a first fixed-bed reactor using the same ⅛-inch macropellet catalyst employed in the second stage. The vapor product from the first fixed-bed reactor contains olefins or other partially saturated unstable compounds which deactivate the second-stage catalyst and accordingly a temperature rise increase of about 1–2° F. per day in the second-stage reactor is required to maintain the overall desulfurization at 99 percent, resulting in a maximum run length of about 1–2 months.

It is not intended that the invention should be restricted to the details disclosed in the examples or elsewhere, since many variations may be made by those skilled in the art without departing from the scope of the following claims, which are intended to define the true scope of the invention.

I claim:
1. A two-stage process for upgrading heavy mineral oil stocks which comprises:
   (a) contacting a heavy mineral oil stock comprising a substantial proportion of material boiling above about 1,000° F. in liquid phase with powdered catalyst in a slurry, said catalyst being selected from the class consisting of the Group VI–B and Group VIII metals and their oxides and sulfides, at elevated temperatures and pressures while passing hydrogen through the slurry;
   (b) withdrawing a liquid-free vaporized product comprising hydrogen and partially refined lower boiling materials from the slurry; and
   (c) without intervening fractionation, contacting said liquid-free, vaporized product in vapor phase and at elevated temperatures and pressures, with a bed of macropellet hydrofining catalyst comprising a Group VI–B and/or Group VIII metal or compounds thereof supported on 1⁄32–½″ pellets of an adsorbent oxide carrier.

2. The method of claim 1 wherein the particle diameter of the powdered catalyst is less than about 40 microns.

3. The method of claim 1 wherein at least about 50 percent of the heavy mineral oil stock boils above 1,000° F.

4. The method of claim 3 wherein the heavy mineral oil stock is a petroleum residuum.

5. The method of claim 1 wherein said contacting step (a) is carried out at a temperature of about 700 to 1,000° F. and a pressure of about 100 to 5,000 p.s.i.g.

6. The method of claim 5 wherein said contacting steps (a) and (c) are carried out at substantially the same pressure.

7. The method of claim 5 wherein said contacting step (c) is carried out at a temperature of about 650 to 750° F.

8. The method of claim 1 wherein each of said catalysts of steps (a) and (c) comprise a Group VI–B metal sulfide combined with a Group VIII metal sulfide.

9. The method of claim 8 wherein each of said catalysts is distended upon an adsorbent oxide base having a Cat-A activity index below about 20.

10. A method for upgrading heavy mineral oil stocks comprising the steps of forming a slurried catalyst suspension in a first contacting zone comprising finely divided hydrogenating catalyst having particle diameters less than about 40 microns suspended in 1 to 100 volumes of heavy mineral oil feedstock per volume of catalyst, said feedstock containing 30 to 100 volume-percent residuum components boiling above 1,000° F., maintaining the bed at a temperature of 700 to 1,000° F. and a pressure of 100 to 5,000 p.s.i.g., sufficient to form vaporized products boiling in the gas-oil range, bubbling hydrogen gas upwardly through said slurry bed in amounts sufficient to maintain the powdered catalyst dispersed in the liquid phase and sweep out vaporized low-boiling materials, withdrawing a liquid-free, vaporized product comprising hydrogen and partially refined lower boiling materials from said first contacting zone, passing said liquid-free, vaporized product in vapor phase without intervening fractionation through a second contacting zone containing a fixed bed of supported macropellet hydrofining catalyst at a temperature of 600 to 800° F. and a pressure substantially the same as that used in the first contacting zone, and recovering the treated product from the effluent of said second reaction zone, said macropellet hydrofining catalyst comprising a Group VI–B and/or Group VIII metal or compounds thereof supported on 1⁄32–½″ pellets of an adsorbent oxide carrier.

11. The method of claim 10 wherein the hydrogenating and hydrofining catalysts are selected from the class consisting of the Group VI–B and Group VIII metals and their oxides and sulfides.

12. The method of claim 10 wherein the hydrogenating and hydrofining catalysts comprise a Group VI–B metal sulfide combined with a Group VIII metal sulfide.

13. The method of claim 12 wherein the Group VI–B metal is molybdenum and the Group VIII metal is cobalt.

14. The method of claim 10 wherein the hydrogenating and hydrofining catalysts are distended upon an absorbent oxide base having a Cat-A activity below about 20.

References Cited by the Examiner
UNITED STATES PATENTS

| | | | |
|---|---|---|---|
| 2,952,625 | 9/1960 | Kelley et al. | 208—210 |
| 3,180,820 | 4/1965 | Gleim et al. | 208—210 |

DELBERT E. GANTZ, *Primary Examiner.*

A. RIMENS, *Assistant Examiner.*